United States Patent
Huang (10) Patent No.: US 10,274,799 B2
(45) Date of Patent: Apr. 30, 2019

(54) ARRAY SUBSTRATE INCLUDING A TEST PATTERN AND FABRICATION METHOD THEREOF, TEST METHOD AND DISPLAY DEVICE

(71) Applicants: BOE Technology Group Co., Ltd., Beijing (CN); HEFEI BOE Optoelectronics Technology Co., Ltd., Hefei (CN)

(72) Inventor: Shiqiang Huang, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 14/914,596

(22) PCT Filed: Sep. 16, 2015

(86) PCT No.: PCT/CN2015/089721
§ 371 (c)(1),
(2) Date: Feb. 25, 2016

(87) PCT Pub. No.: WO2016/165275
PCT Pub. Date: Oct. 20, 2016

(65) Prior Publication Data
US 2017/0059953 A1    Mar. 2, 2017

(30) Foreign Application Priority Data
Apr. 17, 2015  (CN) .......................... 2015 1 0184720

(51) Int. Cl.
| G02F 1/1362 | (2006.01) |
| G09G 3/00 | (2006.01) |
| G02F 1/1343 | (2006.01) |
| G02F 1/1368 | (2006.01) |
| G02F 1/1333 | (2006.01) |

(52) U.S. Cl.
CPC ...... G02F 1/136227 (2013.01); G02F 1/1368 (2013.01); G02F 1/13439 (2013.01);
(Continued)

(58) Field of Classification Search
CPC .............. H01L 27/124; H01L 27/3248; G02F 2001/134372; G02F 1/136227; G02F 1/1368; G02F 2001/136254; G09G 3/006
(Continued)

(56) References Cited

U.S. PATENT DOCUMENTS

2003/0058396 A1* 3/2003 Shih ................. G02F 1/134363
349/141
2004/0263460 A1   12/2004 Lu
(Continued)

FOREIGN PATENT DOCUMENTS

| CN | 202948234 U | 5/2013 |
| CN | 103217840 A | 7/2013 |

(Continued)

OTHER PUBLICATIONS

Jan. 12, 2016—(WO)—International Search Report and Written Opinion Appn PCT/CN2015/089721 with English Tran.
(Continued)

*Primary Examiner* — David Chen
(74) *Attorney, Agent, or Firm* — Banner & Witcoff, Ltd.

(57) ABSTRACT

An array substrate and a fabrication method thereof, a test method and a display device are provided. The array substrate comprises a plurality of pixel units formed on a base substrate, a thin film transistor (TFT) and a pixel electrode, a passivation layer, and a common electrode sequentially formed on the base substrate being provided in the pixel unit, the pixel electrode being connected with a drain electrode of the thin film transistor (TFT), wherein, a via hole located above the pixel electrode is further provided in (Continued)

the at least one of the pixel units, the via hole penetrates through the common electrode and the passivation layer, and a bottom of the via hole is in contact with a conductive surface (S, S'), and the conductive surface (S, S') is electrically connected with a portion of the pixel electrode.

11 Claims, 5 Drawing Sheets

(52) U.S. Cl.
CPC ....... *G02F 1/134336* (2013.01); *G09G 3/006* (2013.01); *G02F 1/133345* (2013.01); *G02F 1/136286* (2013.01); *G02F 2001/134318* (2013.01); *G02F 2001/134372* (2013.01); *G02F 2001/136231* (2013.01); *G02F 2001/136254* (2013.01); *G02F 2201/121* (2013.01); *G02F 2201/123* (2013.01); *G02F 2201/40* (2013.01)

(58) Field of Classification Search
USPC ............... 257/48, 59, 72; 345/87, 173, 205
See application file for complete search history.

(56) References Cited

U.S. PATENT DOCUMENTS

| | | | | |
|---|---|---|---|---|
| 2005/0094079 | A1* | 5/2005 | Yoo | ................... G02F 1/134363 349/141 |
| 2006/0001803 | A1* | 1/2006 | Park | .................... G02F 1/13439 349/113 |
| 2006/0290864 | A1* | 12/2006 | Oh | .................... G02F 1/134363 349/141 |
| 2008/0116459 | A1* | 5/2008 | Chen | ..................... H01L 27/124 257/59 |
| 2009/0101908 | A1* | 4/2009 | Kwack | .............. G02F 1/136286 257/59 |
| 2013/0126876 | A1* | 5/2013 | Shin | .................... H01L 29/6675 257/59 |
| 2015/0370110 | A1 | 12/2015 | Lin et al. | |
| 2016/0187732 | A1 | 6/2016 | Zhao | |

FOREIGN PATENT DOCUMENTS

| | | |
|---|---|---|
| CN | 103700671 A | 4/2014 |
| CN | 104076537 A | 10/2014 |
| CN | 104749845 A | 7/2015 |
| EP | 2672316 A1 | 12/2013 |
| WO | 2014169543 A1 | 10/2014 |

OTHER PUBLICATIONS

Dec. 12, 2017—(CN) Second Office Action Appn 201510184720.2 with English Tran.
Apr. 27, 2017—(CN) First Office Action Appn 201510184720.2 with English Tran.
Oct. 31, 2018—(EP) Extended European Search Appl 15832868.2.

\* cited by examiner

ARRAY SUBSTRATE INCLUDING A TEST PATTERN AND FABRICATION METHOD THEREOF, TEST METHOD AND DISPLAY DEVICE

The application is a U.S. National Phase Entry of International Application No. PCT/CN2015/089721 filed on Sep. 16, 2015, designating the United States of America and claiming priority to Chinese Patent Application No. 201510184720.2 filed on Apr. 17, 2015. The present application claims priority to and the benefit of the above-identified applications and the above-identified applications are incorporated by reference herein in their entirety.

TECHNICAL FIELD

Embodiments of the present disclosure relate to an array substrate and a fabrication method thereof, a test method and a display device.

BACKGROUND

A Thin film transistor Liquid Crystal Display (TFT-LCD), as a flat-panel display device, is more and more frequently applied to a high-performance display field, due to characteristics such as small size, low power consumption, no radiation and relatively low fabrication cost.

The TFT-LCD is mainly comprised of an array substrate and a color filter substrate. Liquid crystals are filled between the array substrate and the color filter substrate; by controlling deflection of the liquid crystal, control of light intensity can be implemented; and by a filtering function of the color filter substrate, color image display is implemented.

An existing TFT-LCD fabrication process mainly includes four stages, which are color filter substrate fabrication process, Array (array substrate fabrication) process, Cell (liquid crystal cell fabrication) process, and Module (module assembly) process respectively. As an important process in TFT-LCD production, the Array process is usually forming a separate thin film transistor (TFT) array circuit on a glass substrate, and quality of the array circuit will directly affect display quality of a product. However, in an actual production process, undesirable phenomena such as Mura, dark spot and chromatic aberration will occur to the array substrate, due to influence of its production environment, a technological level, or other factors, thus seriously affecting display effect of a display device.

Therefore, in order to avoid the above-described undesirable phenomena, characteristics of the TFT can be tested by a test apparatus. For example, an on-current $I_{on}$ and an off-current $I_{off}$ of the TFT, temperature sensitivity or light sensitivity of the TFT, and other performance parameters are tested. In a related art, a test element located on a peripheral region of a display panel may be tested. However, data obtained from the tested element cannot directly and truly reflect the actual characteristics of the TFT within respective pixel units on the array substrate, thus reducing accuracy of a test result.

SUMMARY

An embodiment of the present disclosure provides an array substrate, comprising a plurality of pixel units formed on a base substrate, a thin film transistor and a pixel electrode, a passivation layer and a common electrode sequentially formed on the base substrate being provided in the pixel unit, the pixel electrode being connected with a drain electrode of the thin film transistor, wherein, a via hole located above the pixel electrode is further provided in at least one of the pixel units, the via hole penetrates through the common electrode and the passivation layer, a bottom of the via hole is in contact with a conductive surface electrically connected with a portion of the pixel electrode.

Another embodiment of the present disclosure provides a fabrication method of an array substrate, comprising: Step One: forming a pixel electrode layer on a substrate by a patterning process, the pixel electrode layer including a plurality of pixel electrodes; Step Two: above at least one pixel electrode, forming a test pattern covering at least a portion of the pixel electrode, the test pattern being exposed at a surface of the array substrate in a test procedure; Step Three: forming a common electrode on a surface of the substrate with the above described structures formed thereon.

Still another embodiment of the present disclosure provides a display device comprising the above-described array substrate.

Still another embodiment the present disclosure provides a test method of an array substrate, comprising: providing the above-described array substrate; and directly placing a test terminal on the conductive surface through the via hole.

BRIEF DESCRIPTION OF THE DRAWINGS

In order to clearly illustrate the technical solution in the embodiments of the present disclosure or in the prior art, the drawings necessary for description of the embodiments or the prior art will be briefly described hereinafter; it is obvious that the described drawings are only related to some embodiments of the present disclosure, for which one ordinarily skilled in the art still can obtain other drawings without inventive work based on these drawings.

DETAILED DESCRIPTION

Hereinafter, the technical solutions of the embodiments of the disclosure will be described in a clearly and fully understandable way in connection with the drawings in the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide an array substrate and a fabrication method thereof, a test method and a display device, which can solve the problem that a test result of a test element located in a peripheral region of a display panel cannot truly reflect the characteristics of the TFT within the pixel unit.

Figure 1:
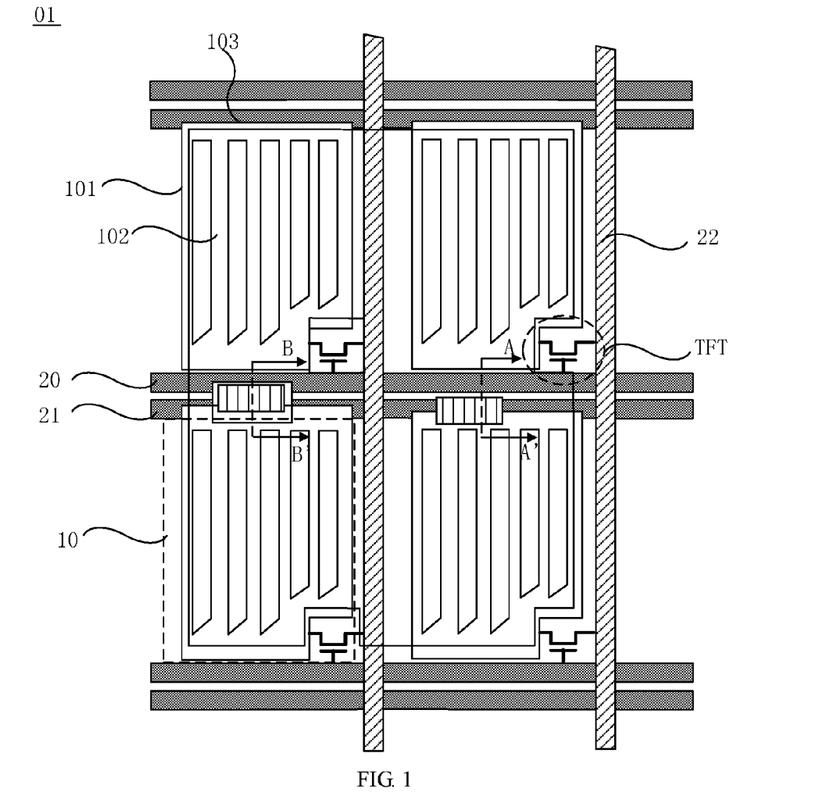
FIG. 1 is a partial planar structural schematic diagram of an array substrate provided by an embodiment of the present disclosure.

An embodiment of the present disclosure provides an array substrate 01, which, as shown in FIG. 1, may comprise a plurality of pixel units 10. A TFT as well as a pixel electrode 101, a passivation layer 104, and a common electrode 102 sequentially formed on the base substrate are provided in the pixel unit 10. The pixel electrode 101 is connected with a drain electrode of the TFT, and the pixel electrode 101 is located below the common electrode 102.

In at least one of the pixel units 10, a via hole located above the pixel electrode 101 is further provided. The via hole penetrates through the common electrode 102 and the passivation layer 104. The bottom of the via hole is in contact with a conductive surface, and the conductive surface is electrically connected with a portion of the pixel electrode 101.

Figure 2:
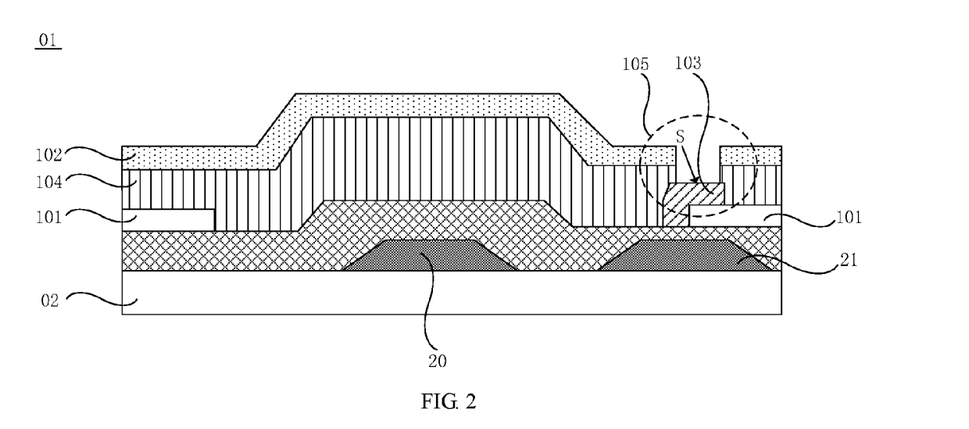
FIG. 2 is a sectional view of the array substrate in FIG. 1 along A-A'.

In the embodiment shown in FIG. 2, a conductive test pattern 103 is further provided in the least one pixel unit 10. The test pattern 103 at least covers a portion of the pixel electrode 101, and is in direct contact with the pixel electrode 101. In a test procedure, an upper surface of the test pattern 103 is exposed at a surface of the array substrate 01 through a first via hole 105, so that a test probe can be in direct contact with the test pattern 103 so as to test the characteristics of the TFT in the pixel unit 10.

It should be noted that, firstly, "above" and "below" in the embodiment of the present disclosure are referred to in terms of distances of respective thin film layers from the base substrate 02 in the array substrate 01. For example, the pixel electrode 101 is located below the common electrode 102, which refers to that a distance between the pixel electrode 101 and the base substrate 02 is less than a distance between the common electrode 102 and the base substrate 02. Herein, the base substrate 02 may be a glass substrate or a transparent substrate made of any other material.

Secondly, when the pixel electrode 101 is located below the common electrode 102, the pixel electrode 101 may be of a planar structure, and the common electrode 102 may be of a slit structure. As a result, a liquid crystal display device of an Advanced-Super Dimensional Switching (AD-SDS, briefly referred to as ADS) type may be constituted. An AD-SDS technology forms a multi-dimensional electric field by a parallel electric field generated by edges of the planar pixel electrode 101 and a longitudinal electric field generated between the pixel electrode 101 and the common electrode 102, so that, in the liquid crystal cell of the display device, all oriented liquid crystal molecules corresponding between the slits of the slit common electrode 102, and all oriented liquid crystal molecules above the pixel electrode 101, can generate rotary conversion, thus improving a working efficiency of the oriented liquid crystal molecules and increasing a light transmission efficiency. Therefore, a switching technology in the AD-SDS mode can improve picture quality of TFT-LCD products, with advantages such as high resolution, high transmittance, low power consumption, wide viewing angle, high aperture ratio, low chromatic aberration, no push Mura, etc.

Hereinafter, the embodiments of the present disclosure are all illustrated with the array substrate constituting the display device in the AD-SDS mode as an example.

Thirdly, in order to avoid influence of the test pattern on an aperture ratio of the display device, the test pattern 103 may be disposed in a non-transmissive region. For example, in a case that the array substrate 01 is provided thereon with a gate line 20 and a common electrode line 21 adjacent to the gate line and parallel to the gate line 20, the test pattern 103 may be disposed right above the gate line 20 or the common electrode line 21.

Alternatively, as shown in FIG. 1, the test pattern 103 is disposed between the gate line 20 and the common electrode line 21. As a result, not only a test of the pixel electrode 101 may be implemented by the test pattern 103, but also influence of the test pattern 103 on the aperture ratio of the display device can be avoided. Furthermore, since the test pattern 103 is located between the gate line 20 and the common electrode line 21, i.e., the test pattern 103 is disposed to across the gap between the gate line 20 and the common electrode line 21, thus reducing an overlapping part between the test pattern 103 and the common electrode line 21, so that parasitic capacitance between the test pattern 103 and the common electrode line 21 can be reduced.

Fourthly, the number of the test patterns 103 is not limited in the embodiment the present disclosure. In order to improve test accuracy, the above-described test pattern 103 may be disposed within each pixel unit 10 on the array substrate 01. Of course, in order to improve test efficiency, the above-described test patterns 103 may also be disposed within part of the pixel units 10. For example, the test patterns 103 may be respectively disposed in the pixel units 10 corresponding to positions located at four corners of the array substrate 01. The above-described four corners of the array substrate 01, for example, refer to that, assuming that the array substrate is rectangle, the above-described four corners may be four corners of the rectangle array substrate. Herein, a region where each corner of the array substrate 01 is located corresponds to at least one pixel unit 10. Therefore, as for some array substrates 01 in which defects are apt to occur in a corner positions, the test may be performed on only the above-described position where the defects are apt to occur, without a need to test the entire array substrate. Thus, it is possible to reduce time and procedure for the test, and improve production efficiency.

Alternatively, the above-described test pattern 103 may be disposed in the pixel unit 10 in a central region of the array substrate 01. Herein, in a case that the array substrate is rectangle, the at least one pixel unit 10 located near an intersection of diagonals of the rectangle array substrate may be the above-described central region. During displaying of a display panel constituted by the above-described array substrate 01, user's attention will stay in a central position of the above-described display panel in most cases. Thus, a display defect in the central position will greatly degrade the display effect. Therefore, the test pattern 103 may be disposed in the pixel unit 10 located in the central region of the array substrate 01, so as to detect the defect which appears in the above-described position.

Of course, the distribution situation of the plurality of test patterns 103 on the array substrate is only exemplarily illustrated above, and other distribution modes will no longer repeated here, which, however, should be within the protection scope of the present disclosure.

An embodiment of the present disclosure provides an array substrate, comprising a plurality of pixel units. A TFT at various layers, a pixel electrode and a common electrode disposed on different layers are provided in the pixel unit. The pixel electrode is connected with a drain electrode of the TFT and located below the common electrode. Herein, at least one pixel unit is further provided with a test pattern covering at least a portion of the pixel electrode. In a test procedure, the test pattern can be exposed at a surface of the array substrate. As a result, a test probe can be made in direct contact with the test pattern; because the test pattern covers a portion of the pixel electrode, the test pattern is electrically connected with the pixel electrode, so that the test probe can directly test performance of the TFT within the pixel unit, without a need to test the TFT in a peripheral region, which further improves accuracy of test data.

It should be noted that, in the test procedure, the test pattern 103 is exposed at a surface of the array substrate 01, means that, in the test procedure, a surface of the test pattern 103 is not covered by any other thin film layer. For a liquid crystal display device, a liquid crystal alignment layer may be formed on the array substrate, and the above-described test procedure is generally performed before a preparation process of the liquid crystal alignment layer. Hereinafter, the above-described solution will be described in detail by embodiments.

Embodiment One

As shown in FIG. 1, an array substrate 01 is provided thereon with horizontal gate lines 20 and vertical data lines 22 intersecting with each other, and a plurality of pixel units 10 arranged in matrix are defined by the intersected gate lines 20 and the data lines 22. The array substrate 01 further comprises a pixel electrode 101 and a common electrode 102 disposed on different layers. Herein, characteristics of the pixel electrode 101 and the common electrode 102 can refer to the foregoing description, which will not be repeated here.

FIG. 2 shows a partial sectional view of the array substrate in FIG. 1 taken along A-A'. It can be seen that a passivation layer 104 is disposed between the pixel electrode 101 and the common electrode 102. For example, the passivation layer is an insulating layer such as $SiO_2$ and $Si_3N_4$.

The test pattern 103 is located between the passivation layer 104 and the pixel electrode 101, and a lower surface of the test pattern 103 is in contact with the pixel electrode 101.

Corresponding to the test pattern 103, a first via hole 105 is disposed in the passivation layer 104 and the common electrode 102 to expose an upper surface of the test pattern 103. The bottom of the first via hole 105 is in contact with the upper surface of the test pattern 103. The upper surface of the test pattern 103 is a conductive surface. Because the test pattern itself is conductive, the upper surface of the test pattern 103 is electrically connected with a portion of the pixel electrode.

Therefore, the test pattern 103 can be exposed at the surface of the array substrate 01 through the first via hole 105, so that a test probe is capable of passing through the first hole 105 to directly contact with the test pattern 103; because the test pattern 103 is in contact with the pixel electrode 101, the test probe can test the pixel electrode 101 in the pixel unit 10.

Furthermore, in the case that the common electrode 102 located in the uppermost layer of the array substrate 01 is of a slit-like structure, the first via hole 105 can be formed simultaneously with a pattern of the common electrode 102 by a patterning process.

Furthermore, the test pattern 103 may be made of a same material and disposed on a same layer as a source electrode and a drain electrode of the TFT, as well as the data line 22. As a result, patterns of the source electrode and the drain electrode of the TFT and a data line 22, as well as the pattern of the test pattern 103 can be formed by one patterning process, so as to simplify a fabrication process.

It should be noted that, the patterning process according to the embodiment of the present disclosure, may refer to a process for forming a predetermined pattern which includes a photolithographic process, or includes a photolithographic process and an etching step, or further includes printing, ink-jetting and so on. The photolithographic process refers to a process, including film forming, exposing, developing, etching and the like, that form a pattern by using photoresist, a mask, and an exposure machine, etc. A corresponding patterning process may be selected according to a structure to be formed in the embodiment of the present disclosure.

Herein, the one patterning process according to the embodiment of the present disclosure, may be illustrated with a case where various exposure regions are formed by one masking and exposing process, and then the various exposure regions are subjected to removal processes such as etching and ashing, to finally obtain an expected pattern.

It should be noted that, in the diagram of the array substrate 01 provided by the embodiment of the present disclosure, only the layer structure related to the present application is marked. In addition, the array substrate 01 provided by the embodiment of the present disclosure can also include other layer structures, for example, a layer structure the same as that in the prior art, e.g., a gate insulating layer located above the gate line 20, and an active layer, etc., which will not be repeated here.

Embodiment Two

The test pattern 103 may be made of a same material and disposed on a same layer as the data line 22 in the Embodiment One, while the test pattern 103 may be made of the same material and disposed on the same layer as the common electrode 102 in a solution of the Embodiment Two.

Figure 3:
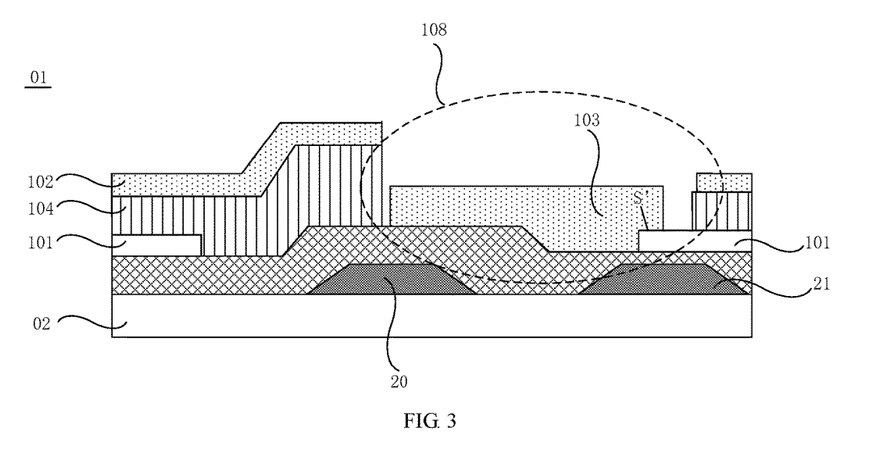
FIG. 3 is sectional view of an array substrate provided by another embodiment of the present disclosure along B-B' in FIG. 1.

For example, FIG. 3 shows a partial sectional view of the array substrate in FIG. 1 taken along the dashed line B-B'. It can be seen that a passivation layer 104 is disposed between the pixel electrode 101 and the common electrode 102.

A second via hole 108 is disposed in the passivation layer 104, corresponding to the pixel electrode 101. The second via hole 108 exposes a portion of an upper surface of the below pixel electrode 101. A bottom of the via hole 108 is in contact with an upper surface S of the pixel electrode 101. The upper surface of the pixel electrode 101 is a conductive surface, and is electrically connected with at least a portion of the pixel electrode.

The test pattern 103 is made of a material same as that of the common electrode 102, and is in contact with the upper surface of the pixel electrode 101 through the second via hole 108.

For example, a layer of transparent conductive material may be coated on a substrate with the second via hole 108 formed thereon, and then the test pattern 103 and the common electrode 102 are formed simultaneously by a patterning process.

Herein, it is necessary to disconnect the test pattern 103 from the common electrode 102. For example, during forming the common electrode 102 with a plurality of slits by masking, exposing and etching, the common electrode 102 is disconnected from the test pattern 103.

Because the material constituting the common electrode 102 is a transparent conductive material, the test probe in contact with the test pattern 103 may be electrically connected with the pixel electrode 101 as well, so as to implement test for the pixel electrode 101.

In summary, the test pattern 103 may be formed simultaneously with the data line 22 in the Embodiment One, while the test pattern 103 may be formed simultaneously with the common electrode 102 in the Embodiment Two. Therefore, with respect to the fabrication process, the solutions provided by the two embodiments as described above have equivalent complexity. However, the material of the test pattern 103 is the same as that constituting the data line 22 which may be a metal material in the Embodiment One, while the material constituting the test pattern 103 is the same as that constituting the common electrode 102 which is the transparent conductive material in the Embodiment Two. The metal material has a stronger conductive ability, as compared with the transparent conductive material. Therefore, the solution provided by the embodiment one is more advantageous to the test for the pixel electrode 101.

Embodiment Three

As compared with the Embodiment One and Embodiment Two, the test pattern 103 in the Embodiment Three may be composed of two thin film layers.

Figure 4A:
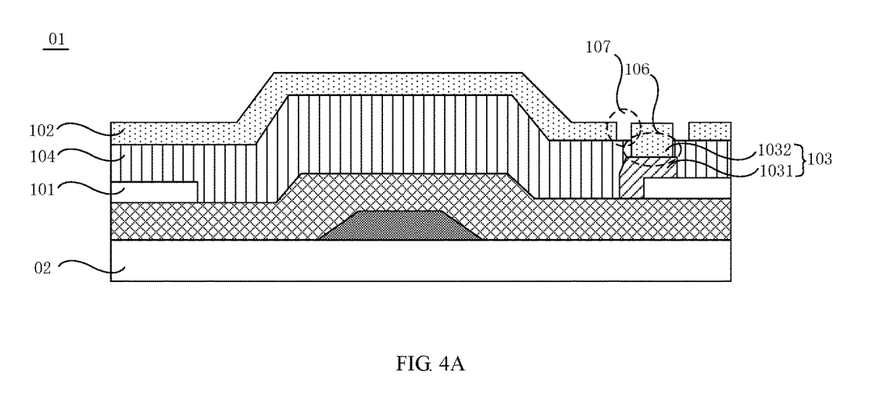
FIG. 4A is a partial sectional view of an array substrate provided by a further embodiment of the present disclosure.

For example, as shown in FIG. 4A, in the array substrate, a passivation layer 104 is disposed between the pixel electrode 101 and the common electrode 102.

The test pattern 103 may include a first connection layer 1031 and a second connection layer 1032.

Therein, the first connection layer 1031 is located between the passivation layer 104 and the pixel electrode 101, and a lower surface of the first connection layer 1031 is in contact with the pixel electrode 101.

A third via hole 106 is disposed in the passivation layer 104, corresponding to the first connection layer 1031. The third via hole 106 exposes a portion of an upper surface of the below conductive test pattern 103. A bottom of the via hole 106 is in contact with the upper surface of the conductive test pattern 103. The upper surface of the conductive test pattern 103 is a conductive surface, and is electrically connected with at least a portion of the pixel electrode 101. The second connection layer 1032 is made of a same material and disposed on a same layer as the common electrode 102, and is in contact with an upper surface of the first connection layer 1031 through the third via hole 106.

Figure 4B:
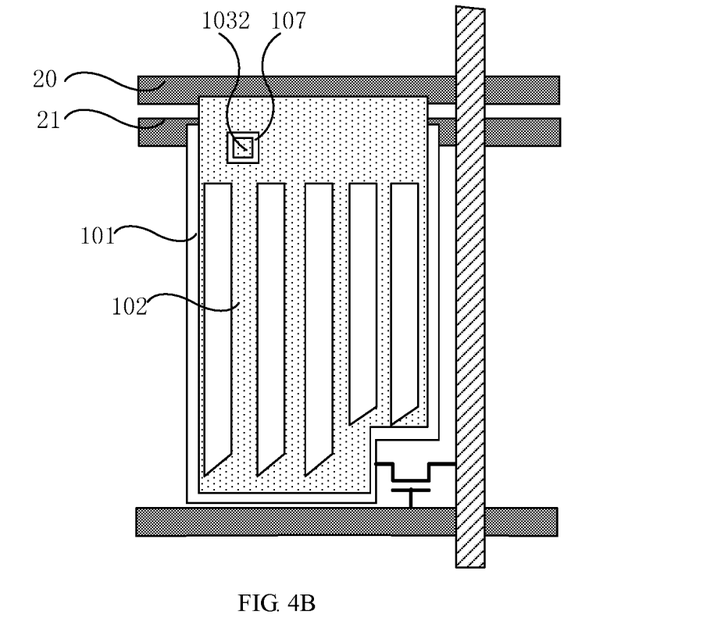
FIG. 4B is a plan view of the array substrate in FIG. 4A.

The second connection layer 1032 is disconnected from the common electrode 102. For example, during forming the common electrode 102 having a plurality of slits by masking, exposing and etching, a gap 107 may be formed between the second connection layer 1032 and the common electrode 102, so that the second connection layer 1032 is disconnected from the common electrode 102. If the second connection layer 1032 is not disconnected from the common electrode 102, when a common voltage is applied to the common electrode 102 after the test procedure, a short circuit will occur between the pixel electrode 101 and the common electrode 102. Therefore, the disconnection between the second connection layer 1032 and the common electrode 102 can avoid such short circuit. FIG. 4B is a structural schematic diagram showing a case that the second connection layer 1032 and the common electrode 102 are made of the same material and disposed on the same layer.

Since the second connection layer 1032 and the common electrode 102 can be made of the same material and disposed on the same layer, a pattern of the second connection layer 1032 may be formed simultaneously with a pattern of the common electrode 102 by one patterning process, so as to simplify a fabrication process.

As a result, since the second connection layer 1032 and the common electrode 102 are disposed on the same layer, and the common electrode 102 is located at the topmost of the array substrate 01, the second connection layer 1032 is also located at the topmost of the array substrate 01, so that the test pattern 103 constituted by the second connection layer 1032 and the first connection layer 1031 in contact with each other can be exposed at the surface of the array substrate 01. In this case, a test probe can be in direct contact with the second connection layer 1032, and the first connection layer 1031 in the test pattern 103 is in contact with the pixel electrode 101, so that the test probe can directly test the pixel electrode 101 within the pixel unit 10. The thin film layer located at the topmost of the above-described array substrate 01 refers to that, the thin film layer has a surface not covered by any other thin film layer during a test procedure of the array substrate 01. For example, during the test procedure, the surface of the second connection layer 1032 which is disposed on the same layer as the common electrode 102 is not covered by any other thin film layer, and thus, the second connection layer 1032 is located at the topmost of the array substrate 01.

Further, in order to simplify the fabrication process, the first connection layer 1031 may be made of the same material and disposed on the same layer as the source electrode and the drain electrode of the TFT as well as the data line 22; as a result, patterns of the source electrode and the drain electrode of the TFT, a pattern of the data line 22, as well as a pattern of the first connection layer 1031 can be formed by one patterning process.

Although the conductive test pattern 103 is formed in the above-described embodiment, those skilled in the art can understand that the test pattern 103 is not necessary. In a case where the test pattern 103 is not formed, the via hole formed above the pixel electrode exposes a conductive upper surface S of the pixel electrode, and the conductive upper surface S' is electrically connected with other portions of the pixel electrode. The test probe can be in direct contact with the upper surface of the pixel electrode through the via hole formed above the pixel electrode, to further test the performance of the TFT within the pixel unit.

An embodiment of the present disclosure provides a display device, comprising any one array substrate as described above. It has the same advantageous effects as those of the array substrate provided by the foregoing embodiments. Since the structure and the advantageous effects of the array substrate have been described in detail in the foregoing embodiments, they will not be repeated here.

It should be noted that, in the embodiment of the present disclosure, the display device, for example, may include a liquid crystal display device, for example, the display device may be a liquid crystal display, a liquid crystal television, a digital photo frame, a mobile phone or a tablet personal computer, and any other product or component having a display function.

An embodiment of the present disclosure provides a fabrication method of an array substrate, which may comprise:

Step One: forming a pixel electrode layer on a substrate by a patterning process, the pixel electrode layer including a plurality of pixel electrodes 101. Therein, the substrate may be a base substrate 02 with a gate line 20, a common electrode line 21, a gate electrode and a gate insulating layer formed thereon. Furthermore, "the plurality of" may refer to at least two.

Step Two: above at least one pixel electrode 101, forming a test pattern 103 electrically connected with the pixel electrode 101, wherein, the test pattern 103 may be exposed at a surface of the array substrate in a test procedure.

Step Three: forming a common electrode 102 on a surface of the substrate with the above-described structure formed.

An embodiment of the present disclosure provides a fabrication method of an array substrate, comprising: firstly, forming a pixel electrode layer on a substrate by a patterning process, the pixel electrode layer including a plurality of pixel electrodes; then, forming a test pattern electrically connected with the pixel electrode, above at least one pixel electrode, wherein, the test pattern 103 may be exposed at a surface of the array substrate in a test procedure; and finally: forming a common electrode on a surface of the substrate with the above-described structure formed thereon. As a result, a test probe may be made in direct contact with the test pattern; because the test pattern covers a portion of the pixel electrode, the test pattern is electrically connected with the pixel electrode, so that the test probe may directly test performance of the TFT within the pixel unit, without a need to test the TFT in a peripheral region, which further improves accuracy of test data.

It should be noted that, in the above-described test procedure, the test pattern 103 is exposed at a surface of the array substrate 01, which refers to that, in the test procedure, the surface of the test pattern 103 is not covered by any other thin film layer. For a liquid crystal display device, a liquid crystal alignment layer may be formed on the array substrate, and the above-described test procedure is generally performed before a preparation process of the liquid crystal alignment layer. Hereinafter, the above-described solution will be described in detail by embodiments.

Embodiment Four

Figure 5:
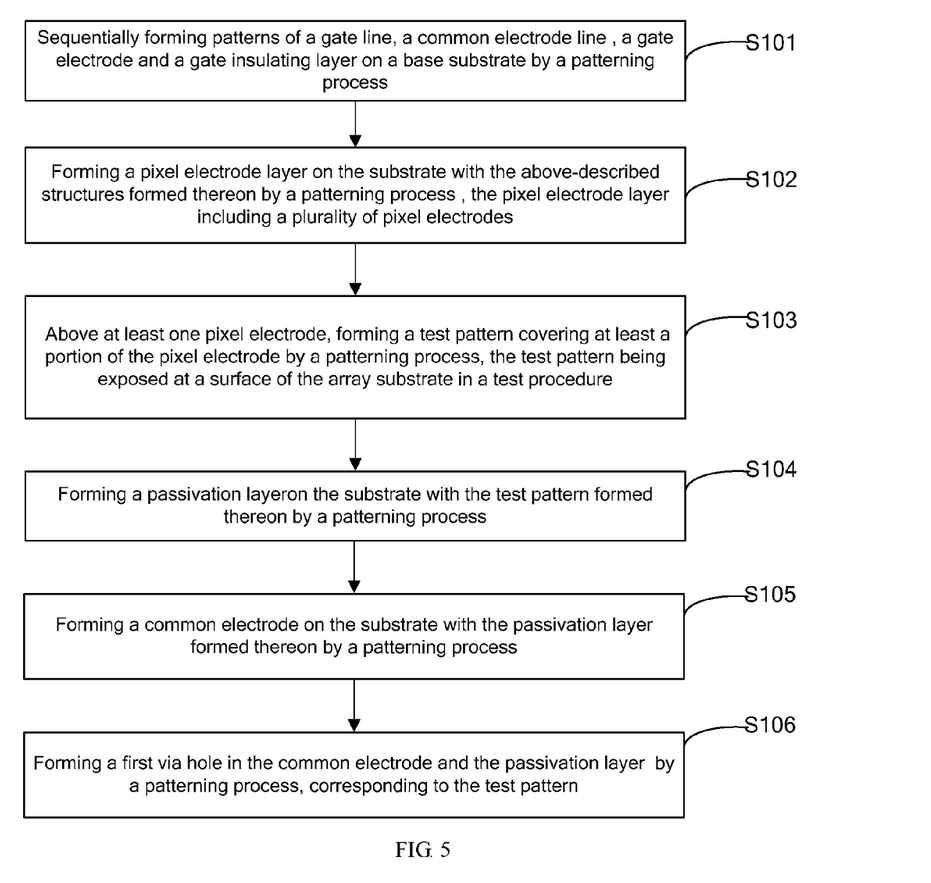
FIG. 5 is a flow chart of a fabrication method of an array substrate provided by an embodiment of the present disclosure.

A fabrication method of an array substrate 01, as shown in FIG. 5, may comprise:

S101: sequentially forming patterns of a gate line 20, a common electrode line 21, a gate electrode and a gate insulating layer by a patterning process, on a base substrate 02;

S102: forming a pixel electrode layer by a patterning process, on the substrate with the above-described structure formed thereon, the pixel electrode layer including a plurality of pixel electrodes 101. For example, a transparent conductive layer may be coated on the substrate with the above-described structure formed thereon, and then the plurality of pixel electrodes 101 are formed by masking, exposing and etching processes. As shown in FIG. 1, each pixel unit 10 corresponds to one pixel electrode 101.

S103: above at least one pixel electrode, forming a test pattern 103 covering at least a portion of the pixel electrode 101 by a patterning process, the test pattern 103 being exposed at a surface of the array substrate in a test procedure.

For example, a data metal layer is formed on the surface of the substrate with the pixel electrode 101 formed, and then the test pattern 103, a source electrode and a drain electrode of the TFT, as well as the data line 22 are formed by one process of masking, exposing and etching. Since patterns of the source electrode and the drain electrode of the TFT, the pattern of the data line 22, as well as the test pattern 103 are formed by one patterning process, a fabrication process can be simplified.

It should be noted that, the above-described data metal layer can be any metal element among metals of copper (Cu), aluminum (Al), molybdenum (Mo), titanium (Ti), chromium (Cr) or tungsten (W), or an alloy composed of the above-described metal elements.

S104: forming a passivation layer 104 by a patterning process, on the substrate with the test pattern 103 formed.

For example, a passivation layer 104 may be coated on a surface of the test pattern 103. The passivation layer 104 may be formed of silicon nitride or silicon dioxide.

S105: forming a common electrode 102 by a patterning process, on the substrate with the passivation layer 104 formed.

For example, a transparent conductive layer may be coated on a surface of the passivation layer 104, and the transparent conductive layer may be formed of indium tin oxide or indium zinc oxide. Then, a pattern of the common electrode 102 having a slit structure is formed by a process of masking, exposing and etching.

S106: forming a first via hole 105 in the common electrode 102 and the passivation layer 104, corresponding to the test pattern 103, by a patterning process, to expose an upper surface of the test pattern 103. The array substrate 01 finally formed is as shown in FIG. 2.

For example, a layer of photoresist may be coated on a surface of the common electrode 102 with the slit structure formed, and the above-described first via hole 105 is formed by a process of masking, exposing and etching.

Alternatively, step S105 and step S106 as described above may be incorporated.

For example, firstly, after the transparent conductive layer is coated on the surface of the passivation layer 104, a layer of photoresist is formed on a surface of the transparent conductive layer, and by masking and exposing processes with a semi-transparent mask, a photoresist completely-removed region corresponding to a position of the first via hole 105, a photoresist half-reserved region corresponding to a position of the slit of the common electrode 102, and a photoresist completely-reserved region corresponding to other positions on the transparent conductive layer are formed.

Next, by an etching process, the transparent conductive layer in the photoresist completely-removed region is removed and the remaining photoresist in the photoresist half-reserved region is ashed away.

Next, the passivation layer 104 in the photoresist completely-removed region is etched, and then the transparent conductive layer in the photoresist half-reserved region is removed. Finally, the photoresist is stripped, so as to form the common electrode 102 having a plurality of slits and the first via hole 105.

Embodiment Five

The test pattern 103 according to Embodiment Four and the data line 22 may be made of a same material on a same layer. However, in the solution provided by this embodiment, the material for the test pattern 103 may be the same as that for the common electrode 102.

Figure 6:
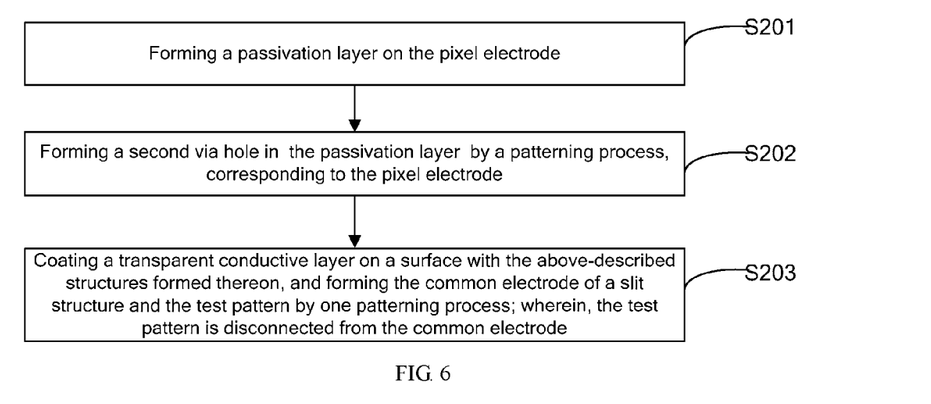
FIG. 6 is a flow chart of another fabrication method of an array substrate provided by an embodiment of the present disclosure.

For example, after the pixel electrode 101 is formed, a method of fabricating the array substrate 01, as shown in FIG. 6, may comprise:

S201: forming a passivation layer 104 on the pixel electrode 101.

S202: forming a second via hole 108 in the passivation layer 104, corresponding to the pixel electrode 101, by a patterning process.

S203: coating a transparent conductive layer on a surface of the substrate with the above-described structure formed thereon, and forming the common electrode 102 having a plurality of slits and the test pattern 103 by one patterning process; wherein, the test pattern 103 is disconnected from the common electrode 102. The array substrate finally formed is as shown in FIG. 3.

For example, in a procedure of forming the common electrode 102 having a plurality of slits by masking, exposing and etching, the common electrode 102 is disconnected from the test pattern 103.

Since the material for the common electrode 102 is a transparent conductive material, the test probe in contact with the test pattern 103 may be electrically connected with the pixel electrode 101 as well, so as to implement test for the pixel electrode 101.

In summary, the test pattern 103 and the data line 22 may be formed simultaneously in the Embodiment Four, while the test pattern 103 and the common electrode 102 may be formed simultaneously in the Embodiment Five. Therefore, with respect to the fabrication process, the solutions provided by the two embodiments as described above have equivalent complexity. However, in Embodiment Four, the material of the test pattern 103 is the same as that constituting the data line 22, which may be a metal material; and in Embodiment Five, the material constituting the test pattern 103 is the same as that constituting the common electrode 102, which is the transparent conductive material. However, the metal material has a stronger conductive ability compared to the transparent conductive material. Therefore, the solution provided by Embodiment Four is more conducive to the test for the pixel electrode 101.

Embodiment Six

With respect to the Embodiment Four and Embodiment Five, the test pattern 103 may be formed by two thin film layers.

Figure 7:
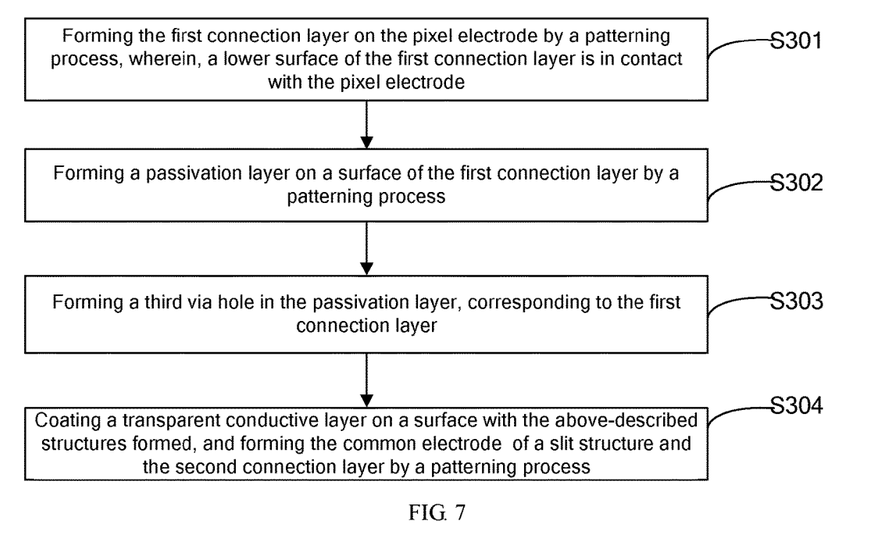
FIG. 7 is a flow chart of still another fabrication method of an array substrate provided by an embodiment of the present disclosure.

For example, after the pixel electrode 101 is formed, in a case that the test pattern 103, as shown in FIG. 4A, may include a first connection layer 1031 and a second connection layer 1032, the method for fabricating the array substrate 01, as shown in FIG. 7, may comprise:

S301: forming the first connection layer 1031 on the pixel electrode 101 by a patterning process, wherein, a lower surface of the first connection layer 1031 is in contact with the pixel electrode 101.

Herein, the first connection layer 1031 may be made of a same material and disposed on a same layer as a source electrode and the drain electrode of the TFT, as well as the data line 22; and as a result, patterns of the source electrode and the drain electrode of the TFT, a pattern of the data line 22, as well as a pattern of the first connection layer 1031 can be formed by one patterning process, so that the fabrication process can be simplified.

For example, a data metal layer 101 may be deposited on the pixel electrode 101, and the patterns of the source electrode and the drain electrode of the TFT, the pattern of the data line 22, as well as the pattern of the first connection layer 1031 are formed simultaneously by one process of masking, exposing and etching. The above-described data metal layer may be of any metal element among metals of copper (Cu), aluminum (Al), molybdenum (Mo), titanium (Ti), chromium (Cr) or tungsten (W), or an alloy composed of the above-described metal elements.

S302: forming a passivation layer 104 by a patterning process, on a surface of the first connection layer 1031.

For example, a passivation layer 104 may be coated on a surface of the test pattern 103. The passivation layer 104 may be formed of silicon nitride or silicon dioxide.

S303: forming a third via hole 106 in the passivation layer 104, corresponding to the first connection layer 1031.

For example, a layer of photoresist may be coated on a surface of the passivation layer 104, and then the third via hole 106 is formed by a masking, exposing and etching processes.

S304: coating a transparent conductive layer on a surface of the substrate with the above-described structure formed thereon, and forming the common electrode 102 having a plurality of slits and the second connection layer 1032 by a patterning process.

Herein, the second connection layer 1032 is in contact with an upper surface of the first connection layer 1031, through the third via hole 106. The second connection layer 1032 is disconnected from the common electrode 102, and the array substrate 01 finally formed is as shown in FIG. 4A.

For example, firstly, a photoresist is coated on a surface of the above-described transparent conductive layer.

Then, by masking and exposing processes, a photoresist removed region is formed, corresponding to the slit of the common electrode 102 and the gap 107, a photoresist reserved region is formed in the other regions of the surface of the transparent conductive layer.

Next, the transparent conductive layer of the photoresist removed region is removed by an etching process.

Finally, the photoresist is stripped, and a pattern of the common electrode 102 having a plurality of slits and the second connection layer 1032 disconnected from the common electrode 102 by the gap 107 can be formed.

Although the disclosure is described in detail hereinbefore with general illustration and embodiments, based on the disclosure, certain amendments or improvements can be made thereto, which is obvious for those skilled in the art. Therefore, the amendments or improvements made to the disclosure without departing from the spirit of the disclosure should be within the scope of the disclosure.

The present application claims priority of Chinese Patent Application No. 201510184720.2 filed on Apr. 17, 2015, the disclosure of which is incorporated herein by reference in its entirety as part of the present application.

The invention claimed is:

1. An array substrate, comprising a plurality of pixel units formed on a base substrate, a thin film transistor and a pixel electrode, a passivation layer and a common electrode sequentially formed on the base substrate being provided in at least one of the pixel units, the pixel electrode being connected with a drain electrode of the thin film transistor, wherein, a via hole located above the pixel electrode is further provided in the at least one of the pixel units, the via hole penetrates through the common electrode and the passivation layer, a bottom of the via hole is in contact with a conductive surface electrically connected with a portion of the pixel electrode, wherein, a test pattern electrically connected with the pixel electrode is further disposed in the at least one of the pixel units, and the conductive surface is a surface of the test pattern, wherein, the array substrate further comprises a gate line and a common electrode line on the base substrate, wherein, in a plan view of the array substrate, the common electrode line and the gate line are parallel to each other and located at a same side of the pixel electrode, and the test pattern is overlapped with the gate line and the common electrode line, wherein, the entire top surface and side surface of the test pattern are straight.

2. The array substrate according to claim 1, wherein, the test pattern and the common electrode are made of a same material and disposed on a same layer, and the test pattern is electrically separated from the common electrode.

3. The array substrate according to claim 1, wherein, the test pattern is disposed in a non-transmissive region.

4. The array substrate according to claim 1, wherein, the common electrode has a plurality of slits.

5. A display device, comprising the array substrate according to claim 1.

6. The array substrate according to claim 1, wherein, the test pattern is apart from lateral sides of the passivation layer.

7. The array substrate according to claim 1, wherein, in the plan view of the array substrate, in a direction parallel with the gate line, the test pattern is located between a side of the gate line facing away from the common electrode line and a side of the common electrode line facing away from the gate line.

8. A test method of an array substrate, comprising:
providing the array substrate according to claim 1; and
directly placing a test terminal on the conductive surface through the via hole.

9. An array substrate, comprising a first pixel unit and a second pixel unit adjacent to each other on a base substrate, wherein the first pixel unit comprises a first thin film transistor and a first pixel electrode connected with a drain electrode of the first thin film transistor, the second pixel unit comprises a second thin film transistor and a second pixel electrode connected with a drain electrode of the second thin film transistor, wherein, the array substrate further comprises a passivation layer and a test pattern, above the first pixel electrode and the second pixel electrode, the test pattern is electrically connected with the first pixel electrode and at least a portion of the test pattern is exposed by the passivation layer, wherein, the array substrate further comprises a gate line and a common electrode line parallel to each other on the base substrate, the test pattern is overlapped with the gate line and the common electrode line, the gate line is connected with a gate electrode of the second thin film transistor, wherein the first pixel electrode is located between the first thin film transistor and the common electrode line.

10. A fabrication method of an array substrate, comprising a plurality of pixel units, the method comprising:
Step One: forming a pixel electrode layer on a substrate by a patterning process, the pixel electrode layer including a plurality of pixel electrodes;
Step Two: above at least one pixel electrode, forming a test pattern covering at least a portion of the pixel electrode, and forming a thin film transistor, the test pattern being exposed at a surface of the array substrate in a test procedure, and the pixel electrode being connected with a drain electrode of the thin film transistor; and
Step Three: forming a common electrode on a surface of the substrate with the above described structures formed thereon,
wherein, the fabrication method further comprises, before the Step One, forming a gate line and a common electrode line on the substrate;
after the Step One, and before the Step Two, forming a passivation layer on the pixel electrode; and
after the forming the passivation layer, the Step Two and the Step Three include: forming a via hole in the passivation layer by a patterning process, corresponding to the pixel electrode, wherein the via hole penetrates through the common electrode and the passivation layer, a bottom of the via hole is in contact with a conductive surface electrically connected with a portion of the pixel electrode,
wherein, in a plan view of the array substrate, the common electrode line and the gate line are parallel to each other and located at a same side of the pixel electrode, and the test pattern is overlapped with the gate line and the common electrode line, and the conductive surface is a surface of the test pattern,
wherein, the entire top surface and side surface of the test pattern are straight.

11. The fabrication method of the array substrate according to claim 10, wherein,
the common electrode has a plurality of slits, and the common electrode and the test pattern are formed by one patterning process from a transparent conductive layer, wherein, the test pattern is disconnected from the common electrode.

* * * * *